(12) United States Patent
Fair et al.

(10) Patent No.: US 8,485,601 B2
(45) Date of Patent: Jul. 16, 2013

(54) MULTI-USE SEAT LINER

(75) Inventors: Paul Fair, Denver, CO (US); Jamie Kummerfeld, Wheat Ridge, CO (US)

(73) Assignee: The Boppy Company, LLC, Golden, CO (US)

( * ) Notice: Subject to any disclaimer, the term of this patent is extended or adjusted under 35 U.S.C. 154(b) by 126 days.

(21) Appl. No.: 13/107,731

(22) Filed: May 13, 2011

(65) Prior Publication Data
US 2012/0286549 A1    Nov. 15, 2012

(51) Int. Cl.
*A47C 31/00* (2006.01)

(52) U.S. Cl.
USPC ................................. 297/219.12; 297/440.11

(58) Field of Classification Search
USPC .................. 297/219.12, 440.11; 472/129, 90, 472/118
See application file for complete search history.

(56) References Cited

U.S. PATENT DOCUMENTS

| | | |
|---|---|---|
| D266,802 S | 11/1982 | Gooding |
| D270,498 S | 9/1983 | Schutz |
| D275,634 S | 9/1984 | Schutz |
| 4,478,453 A | 10/1984 | Schutz |
| 4,695,092 A | 9/1987 | Hittie |
| 4,883,701 A | 11/1989 | Rankin et al. |
| 4,885,200 A | 12/1989 | Perdelwitz, Jr. et al. |
| 4,891,454 A | 1/1990 | Perdelwitz, Jr. et al. |
| 5,127,120 A | 7/1992 | Mason |
| 5,228,745 A | 7/1993 | Hazel |
| 5,407,248 A * | 4/1995 | Jay et al. .................... 297/284.1 |
| D376,505 S | 12/1996 | O'Brien |
| 5,716,101 A * | 2/1998 | Frinier et al. ............ 297/440.22 |
| 5,916,089 A * | 6/1999 | Ive ..................................... 5/655 |
| 5,979,981 A * | 11/1999 | Dunne et al. ............. 297/219.12 |
| 6,036,263 A * | 3/2000 | Gold ......................... 297/219.12 |
| 6,454,352 B1 | 9/2002 | Konovalov et al. |
| 6,467,840 B1 * | 10/2002 | Verbovszky et al. ..... 297/219.12 |
| 6,752,457 B2 | 6/2004 | Gold et al. |
| 6,966,089 B2 | 11/2005 | Gold et al. |
| 7,052,085 B2 | 5/2006 | Hoey-Slocombe et al. |
| 7,222,917 B2 * | 5/2007 | Ward ............................ 297/223 |
| 7,311,357 B2 * | 12/2007 | Gold et al. ............... 297/219.12 |
| 7,374,240 B2 | 5/2008 | Gold et al. |
| 7,588,291 B2 | 9/2009 | Gold et al. |
| 7,806,472 B2 | 10/2010 | Runk et al. |

OTHER PUBLICATIONS

Author Unknown, "Bebe Chic Products—Stroller Liners," Bebe Chic, http://www.bebechic.com/strollers.asp, accessed May 10, 2011, 1 page.

(Continued)

*Primary Examiner* — David Dunn
*Assistant Examiner* — Timothy J Brindley
(74) *Attorney, Agent, or Firm* — Kilpatrick Townsend & Stockton LLP (57) ABSTRACT

Embodiments of the invention provide a seat liner and methods associated with the seat liner. The seat liner may include a fabric having an outer periphery, an upper portion, a lower portion, a left side, and a right side. The seat liner may also include a pair of apertures in the upper portion that are configured to receive a pair of restraint belts and an additional aperture in the lower portion configured to receive a buckle. The restraint belts and buckle may couple together to secure a child placed in the seat. The seat liner may further include a chamber disposed at the outer periphery of one of the sides and a padding member removably held within the chamber to cushion the child placed in the seat.

13 Claims, 6 Drawing Sheets

OTHER PUBLICATIONS

Author Unknown, "Bumbleride 2010 Footmuff and Stroller Liner," Stroller Depot™, http://www.strollerdepot.com/items/bumbleride-footmuff-and-stroller-liner/, accessed May 10, 2011, 2 pages.

Author Unknown, "Eddie Bauer Reversible Stroller Liner—Grey," Amazon.com, http://www.amazon.com/Eddie-Bauer-Reversible-Stroller-Liner/dp/B0033A42L2, accessed May 10, 2011, 7 pages.

Author Unknown, "Koochy-kooz Boutique," Koochy-kooz, http://www.koochykooz.com/boutique.html, accessed May 12, 2011, 7 pages.

Author Unknown, "Luxury Stroller Liners / Stroller Pads," Tivoli Couture, http://www.tivolicouture.com/Luxury-Stroller-Liners-Stroller-Pads.htm, accessed May 10, 2011, 3 pages.

Author Unknown, "Meeno Babies "Cool Mee" Seat Liner Collection," Meeno Babies, http://www.meenobabies.com/, accessed May 10, 2011, 1 page.

Author Unknown, "PiddlePad™," Summer Infant, http://www.summerinfant.com/Products/Travel/Car/PiddlePad™.aspx, accessed May 10, 2011, 1 page.

Author Unknown, "Pink Central Park Stroller Liner," BooYah Baby, http://booyahbaby.com/Pink-Central-Park-Stroller-Liner.html, accessed May 10, 2011, 3 pages.

Author Unknown, "Seat Liners," Maclaren, http://global.maclarenbaby.com/accessories/reversible-seat-liners?lang=en&langVar=en&l, accessed May 10, 2011, 2 pages.

Author Unknown, "Stroller Liners," Pure Joy Collection, http://purejoycollection.com/Stroller_Liners.html, accessed May 10, 2011, 3 pages.

Author Unknown, "Stroller Pads," myMonkeymoo™, http://mymonkeymoo.com/stroller-pads.html, accessed May 9, 2011, 2 pages.

Author Unknown, "Valco Baby Allsorts Universal Seat Pad,"Amazon.com, http://www.amazon.com/Valco-Baby-Allsorts-Universal-Licorice/dp/B004HEWT9A/ref=, accessed May 12, 2011, 6 pages.

* cited by examiner

MULTI-USE SEAT LINER

BACKGROUND OF THE INVENTION

Embodiments of the invention relate generally to seat liners and more specifically to seat liners that are useable with child seats, such as stroller seats, to cushion and comfort a child seated in the child seat.

Child seats, such as strollers and the like, are designed to safely secure and protect a child during transportation and/or other activities. Typically these seats and/or their frames (e.g., stroller frames) are generally made of a plastic or metal base (e.g., polypropylene base, plastic or metal tubing, and the like). The child seat and/or frames often include fabric liners, padding (e.g., foam padding), constraint belts, buckles, handles, wheels, and the like. The child seats and/or frames may also include various other features, such as pockets, shade coverings, wheel locks, and the like and/or may include additional components such as child toys or trays that attach to the child seat or frame and that support the child's food or drink.

Child seats, such as strollers, may be used for children of various ages and sizes ranging from infants to school age children. Children and especially young children that are incapable of walking or crawling often spend a considerable amount of time in strollers or other child seats. The child is often secured or harnessed within the stroller or child seat during the entire time or a majority of the time that the stroller or child seat is being used. A child may become uncomfortable and/or restless after a prolonged amount of time spent and/or harnessed in the stroller or child seat. The child's discomfort and/or restlessness may be amplified due to the design of the child seat and/or due to the materials of the child seat. For example, some inexpensive strollers may only include a thin fabric material upon which the child sits. The thin fabric material may not include any padding to cushion and/or support the child. The lack of padding may cause the child to become uncomfortable and/or restless after an amount of time. Young children, such as infants and newborns, are often incapable of communicating their discomfort and/or restlessness in any way other than crying, which may frustrate or annoy parents, guardians, and/or those in close proximity to the child. Unfortunately, the parent or guardian may not realize that the child is uncomfortable or restless. For these and other reasons, it may be desirable to provide components that may be used with a child seat to comfort a child placed in the child seat.

BRIEF SUMMARY OF THE INVENTION

Embodiments of the invention provide seat liners usable with child seats and methods of using seat liners. The child seats may include stroller seats, car seats, and/or any other type of child seat. In one embodiment, a seat liner includes a fabric material having an outer periphery, an upper portion, a lower portion, a right side, and a left side. The seat liner also includes a pair of apertures in the upper portion that are configured to receive a pair of restraint belts of the seat. An additional aperture is provided in the lower portion to receive a buckle of the seat. The restraint belts and the buckle may be coupled together to secure a child placed in the seat. The seat liner further includes a chamber disposed at the outer periphery of at least one of the sides. The chamber may extend from the upper portion to the lower portion and may removably hold a padding member within the chamber to cushion the child placed in the seat. In one embodiment, the seat liner includes an additional chamber disposed at the outer periphery of the opposite side of the seat liner. The additional chamber also may extend from the upper portion to the lower portion and may removably hold an additional padding member within the additional chamber to cushion the child.

The seat liner may additionally include an attachment member coupled with the outer periphery. The attachment member may be slidable along a portion of the outer periphery or along the entire outer periphery and may be configured to couple with one or more objects so as to attach the object or objects to the seat liner. The chamber and/or additional chamber may include an opening into the chamber that allows the padding member or additional padding member to be inserted within and removed from the respective chamber or additional chamber. The opening may include a flap and a coupling mechanism. The flap may be folded over a portion of the outer surface of the padding and attached to the coupling mechanism to secure the padding within the chamber.

The opening may be positioned near a centerline that extends laterally across the seat liner. The padding member may include an inflatable air bladder, a foam material, a pillow, a gel material, a fabric casing having a fiberfill cushion interior, and the like. The upper portion and/or lower portion may have a semi-circular configuration and the seat liner may also include a middle portion between the upper portion and lower portion. The middle portion may be smaller laterally than the upper portion and/or the lower portion. The padding member and the middle portion may approximate the contour of the child placed in the seat.

Another embodiment provides a seat liner, such as a stroller liner, that includes a flexible fabric having an outer periphery defined by: a semi-circular upper portion positioned longitudinally toward one end of the seat liner, a semi-circular lower portion positioned longitudinally toward an opposite end of the seat liner, a right side, and a left side. The right and left sides may have or may define a biconcave profile. The seat liner also includes a right chamber disposed at the outer periphery of the right side and a left chamber disposed at the outer periphery of the left side. The right and left chambers may extend from the upper portion to the lower portion and may be configured to each receive a padding. The seat liner further includes a right padding removably positioned within the right chamber and a left padding removably positioned within the left chamber. The right and left padding may be configured to cushion a child placed in the child seat.

An attachment member may be coupled with the outer periphery of the seat liner. The attachment member may slide along a portion of the outer periphery or along the entire outer periphery. The attachment member may be coupled with one or more objects to attach the objects to the seat liner. The right and left chambers may each have an opening into the pocket that allows the respective right and left padding to be positioned within and/or removed from the right and left chambers. Each of the openings may include a flap and a coupling mechanism. The flap may be folded over a portion of the respective padding and attached to the coupling mechanism to secure the padding within the respective chamber. The seat liner may additionally include a pair of apertures in the upper portion through which a pair of restraint belts of the child seat may be positioned and may also include an additional aperture in the lower portion through which a buckle of the child seat may be positioned. The restraint belts and the buckle may be attached or coupled together to secure a child within the child seat.

A further embodiment provides a method of using a seat liner. The method may include providing or obtaining a child seat (e.g., a stroller) and providing or obtaining a seat liner. The seat liner may have a fabric, a pair of apertures in an upper portion, an additional aperture in a lower portion, a chamber(s), and padding removably held within the chamber(s) as described herein. The method may also include positioning a restraint belt of the child seat through each of the pair of apertures and positioning a buckle of the child seat through the additional aperture. The method may further include placing a child in the child seat so that the child is seated on the seat liner and may include attaching the restraint belts to the buckle to secure the child in the child seat.

The method may additionally include positioning or placing a padding within the chamber. The padding may be placed within an opening of the chamber and a flap of the opening may be folded over a portion of the outer surface of the padding and coupled with a coupling mechanism to secure the padding within the chamber. Likewise, this same process may apply to an additional padding and additional chamber. The seat liner may include an attachment member coupled with an outer periphery of the seat liner. The attachment member may be slidable along a portion of the outer periphery or along the entire outer periphery. The attachment member may be coupled with one or more objects to attach the object(s) to the seat liner.

An additional embodiment provides a method for configuring a seat liner. The method may include providing a seat liner having a fabric with an outer periphery, an upper portion, a lower portion, a right side, and a left side. The seat liner may also include a chamber disposed at the outer periphery of one of the sides, which extends from the upper portion to the lower portion. In one embodiment the seat liner includes a single chamber that extends along a portion of the left side, along the outer periphery of the upper portion, and along a portion of the right side. In another embodiment the seat liner includes a chamber that extends along a portion of the left side and an additional chamber that extends along a portion of the right side. The seat liner may further include a padding member removably held within the chamber to cushion a child placed in the seat. The method may also include removing the padding member from the chamber to adjust the size of the seat liner. A different padding member may be placed in the chamber to adjust a cushion size of the seat liner or to adjust a cushion softness of the seat liner.

BRIEF DESCRIPTION OF THE DRAWINGS

The present disclosure is described in conjunction with the appended figures.

In the appended figures, similar components and/or features may have the same reference label. Where the reference label is used in the specification, the description is applicable to any one of the similar components having the same reference label.

DETAILED DESCRIPTION OF THE INVENTION

Embodiments of the present invention provide for a seat liner that may be used with various child seats, such as a stroller, car seat, and the like. Embodiments of the invention also provide for methods of using seat liners and methods of configuring seat liners. The description herein generally describes the seat liner being used with strollers, although it should be realized that the seat liner may be used with any child seat or may be used without a child seat. For example, the liner may be placed on the ground or some other surface and used as a changing pad. The seat liner is particularly useful to cushion and comfort small children, such as infants and newborns that may spend a considerable amount of time in a child seat and/or child seat harness. The seat liner may help the child feel comfortable and/or relaxed.

The seat liner is generally made of one or more fabric materials. The fabric materials may include breathable fabrics so that air and/or perspiration may flow through the seat liner to and/or from the child. The fabric material may also be water resistant. Examples of materials that may be used as the fabric material include nylon, LYCRA, polyester, cotton, cotton-polyester blend, rayon, and the like. In some embodiments, the fabric material includes a single layer fabric, while in other embodiments the fabric material includes multiple fabric layers. The fabric material may also include a padding layer or multiple padding layers disposed between the two fabric layers. The padding and/or fabric layers may provide a cushioned seat for the child placed in the child seat. In addition, a front surface of the seat liner (i.e., the surface that will contact the child) may include an additional material or fabric, such as soft polyester or fleece to help keep a child warm in cooler weather and dry and cool in warmer weather. The additional material on the front surface may also comfort and relax the child placed on the seat liner.

The seat liner is generally placed on a child seat, such as a stroller seat. The child is then placed in the child seat so that the child sits atop of the seat liner. The seat liner is flexible to adjust to the contour of the child seat that it is fitted to. The seat liner includes a plurality of apertures or holes through which restraint belts of the child seat are placed. For example, the seat liner may include a pair of apertures in an upper portion through which a pair of restraint belts are positioned and the seat liner may include an additional aperture in a lower portion through which a restraint buckle and belt are positioned. The restraint belts may be buckled to the restraint buckle to secure the child within the child seat. In this arrangement the seat liner functions as a cushioning layer between the child and the child seat without hindering the operation of a child seat harness system.

The seat liner also includes a chamber disposed on at least one side of the seat liner. The chamber has a hollow interior within which a padding may be placed, such as an inflatable air bladder, a foam padding, a gel material, a pillow, a fabric casing having a fiberfill cushion, and the like. The padding may be insertable into the hollow interior of the chamber through an opening. The opening may include a flap that closes or folds over the padding after the padding is inserted into the hollow interior. Instead of using a flap, or in addition thereto, the opening may be coupled with other closure devices such as zippers, buttons, snaps, hook and loop fasteners, and the like. The flap may then be secured to a coupling member to secure the padding within the chamber. With the padding inserted into the chamber, the chamber may cushion and/or support the child placed on the seat liner. For example, the chamber may provide support for the back, shoulder, head, and/or neck of the child. Such support is often necessary for infants and newborns that may not have developed sufficient muscle strength to support their head and/or neck.

The padding may be removed from the chamber and replaced with a different sized padding and/or a padding made of a different material (e.g., a gel padding may be replaced with a pillow). In this manner, the size, cushioning, and/or support of the seat liner may be adjusted to accommodate the needs of the child. Likewise, the seat liner may be removed from the child seat to be washed, cleaned, replaced, and the like. These and other features of the seat liner will be further realized with reference to the figures.

Figure 1:
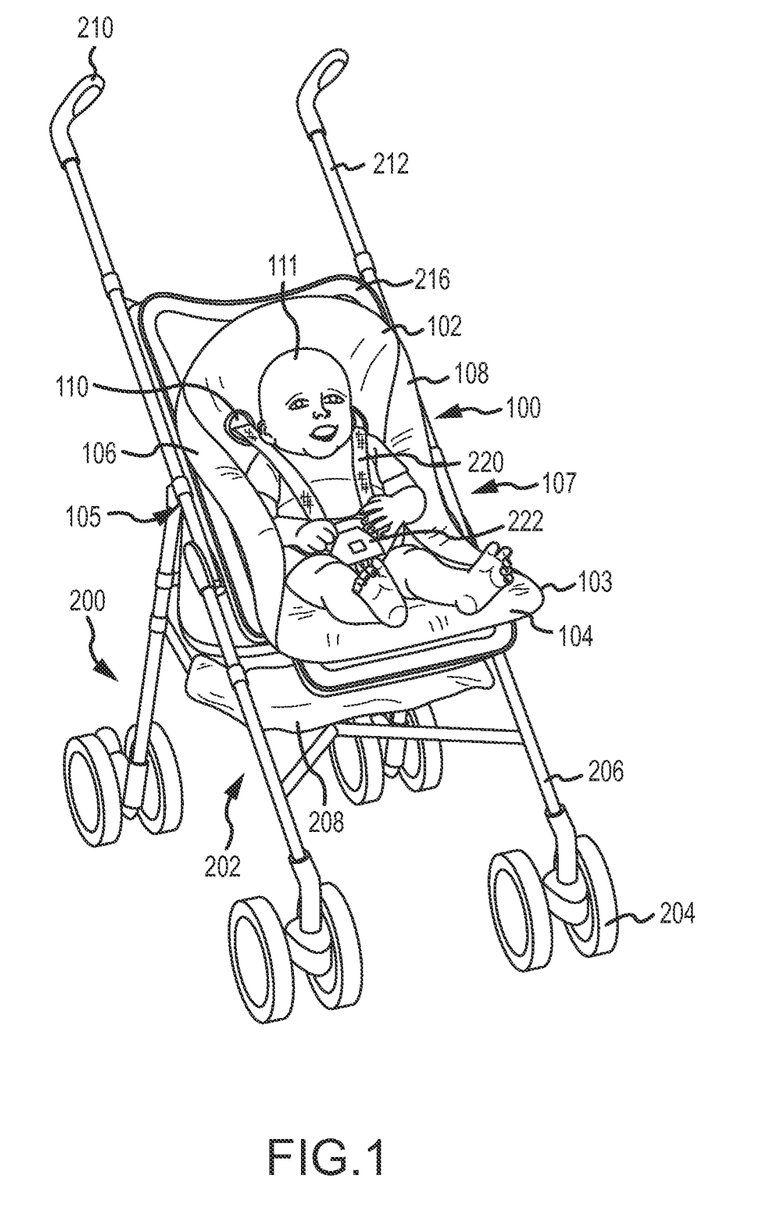
FIG. 1 illustrates a seat liner being used with a stroller to cushion and comfort a child placed in the stroller according to an embodiment of the present invention.

FIG. 1 illustrates a seat liner 100 fitted about or coupled with a stroller. The stroller includes a frame 200 and a seat 202 coupled to the frame 200. The frame 200 includes a plurality of legs 206 that each include one or more wheels 204 upon which the stroller rolls. Although FIG. 1 depicts the stroller including four legs that each include two wheels 204, the stroller may include less wheels and/or legs. For example, the stroller may be a jogging stroller having three legs that each include a single wheel. The seat 202 includes a bottom portion 208 upon which the child 111 sits and includes a back support 216 that supports the child's back.

The seat 202 includes a restraint harness or mechanism. The restraint harness includes a pair of shoulder straps or restraint belts 220 that are positioned around the child's shoulders. The restraint harness also includes a buckle 222 that is connected to a belt (not shown) that is positioned between the child's legs. The restraint belt or shoulder straps 220 are releasably connected to buckle 222 to secure the child 111 in the stroller. The button 222 may include a button that allows the should straps 220 to decouple from the buckle 222. Each shoulder strap 220 may be attached to the back support 216 at a point vertically above the child's shoulder and at a point adjacent the child's waist. The shoulder straps 220 and buckle 222 may comprise a 5 point harness restraint system. In some embodiments the restraint belts or straps 220 may only be attached to the back support 216 at a point adjacent the child's waist so that the restraint belts or straps 220 and buckle 222 comprise a 3 point harness restraint system. In addition, the seat liner may include other arrangements and/or number of apertures or holes. For example, the seat liner may include 5 apertures that are arranged to correspond to the straps or belts of a 5 pt harness system. In other embodiments, the liner may not include any apertures or holes, such as when the liner is used as a changing pad or for other uses.

The frame 200 or seat 202 may include additional components, such as a shade covering (not shown) positioned above the child's head that folds open to partially cover and shade the child 111 or that folds up in an accordion like manner and is positioned adjacent the back support 216 when not being used. The frame 200 may also include a handle or pair of handles 210 that a user grasps to push the stroller. The handles 210 may be attached to the frame 200 via extension tubes 212. In one embodiment, the frame 200 is made of metal or plastic tubing. The frame 200 and/or seat 202 may be foldable to facilitate storage and/or transportation of the stroller. The stroller may also include various padding (not shown), fabric (not shown), and other features that are aesthetically pleasing and/or that comfort the child 111.

The seat liner 100 is fitted about or coupled with the stroller so that a child 111 placed in the stroller sits atop the seat liner 100. The seat liner 100 is generally planar when laid on a flat surface and is flexible so that the seat liner 100 conforms to the shape of the stroller seat 208 and/or child 111. The seat liner 100 provides a cushion layer between the stroller seat 208 and the child 111 to comfort and relax the child. The seat liner 100 includes an outer edge or periphery 103. To facilitate description, liner 100 may be defined in terms of a top portion 102 positioned adjacent the head of the child 111, a lower portion 104 positioned adjacent the child's feet, a right side 107, and a left side 105.

The seat liner 100 includes a pair of apertures 110 positioned in or near the upper portion 102 of the seat liner 100. The apertures 110 may be positioned vertically above the child's shoulders and may be positioned so that the child's head is between the pair of apertures 110. The restraint belts or shoulder straps 220 may be positioned through the apertures 110 so that the restraint belts 220 may be used to secure the child with respect to the stroller. The seat liner includes an additional aperture (see element 112 of FIG. 2) positioned in or near the lower portion 104 between the child's legs. The buckle 222 is positioned through the additional aperture so that the buckle may be attached to the restraint belts 220 to secure the child with respect to the stroller. In this manner, the seat liner 100 may be used with the stroller or any other child seat without hindering or restricting the stroller or child seat's ability to secure the child.

The seat liner 100 additionally includes a left chamber 106 disposed on the left side 105 of the seat liner 100 and a right chamber 108 disposed on the right side 107 of the seat liner. The left and right chambers, 106 and 108, extend from the upper portion 102 to the lower portion 104. The left and right chambers, 106 and 108, are coupled (e.g., sewn) onto opposite sides of the seat liner (see 106 and 108 of FIG. 2A). Each chamber includes a hollow interior within which a padding member (see 130 and 131 of FIG. 2A) is inserted. The padding members, 130 and 131, may be tubular in shape and the chambers, 106 and 108, may fully enclose a respective padding member positioned within the chamber. When the padding members are inserted within the hollow interior of the chambers, 106 and 108, the sides of the seat liner 100 are generally enlarged and tubular in shape corresponding to the shape of the padding members, 130 and 131 (see FIG. 2A). The padding member cushions and/or supports the child 111. For example, the padding member may support the arms, back, head, and/or neck of the child. The shape of the chamber and/or seat liner 100 may be designed to correspond to the shape of the child so that the seat liner 100 ergonomically cushions and supports the child 111.

The fabric forming the left and right chambers, 106 and 108, may be a fabric different than the fabric of the rest of seat liner 100. For example, the fabric may be a stretch fabric or an elastic/resilient fabric (e.g., jersey knit, stretch jersey knit, Lycra® fabric, and the like). Such fabric may expand to hold padding members, 130 and 131, tightly within chambers, 108 and 106 respectively, without smashing or overly constricting the padding members and may contract when the padding members are not used so that chambers, 108 and 106, appear to be a smooth flat surface. The fabric may provide a visually appealing appearance regardless of whether padding members are used.

Figure 2:
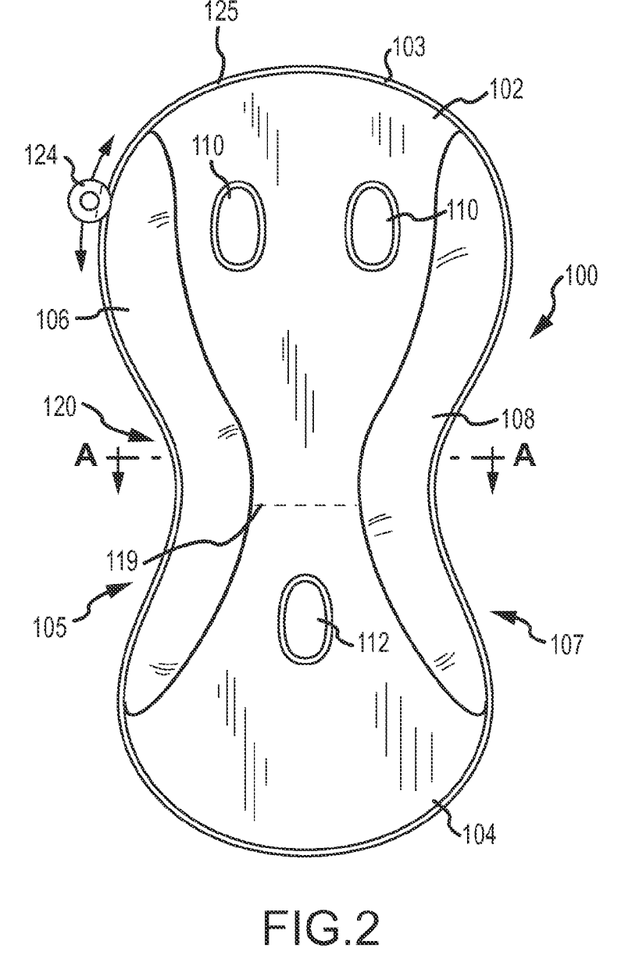
FIG. 2 illustrates a front view of a seat liner according to an embodiment of the present invention.
Figure 2A:
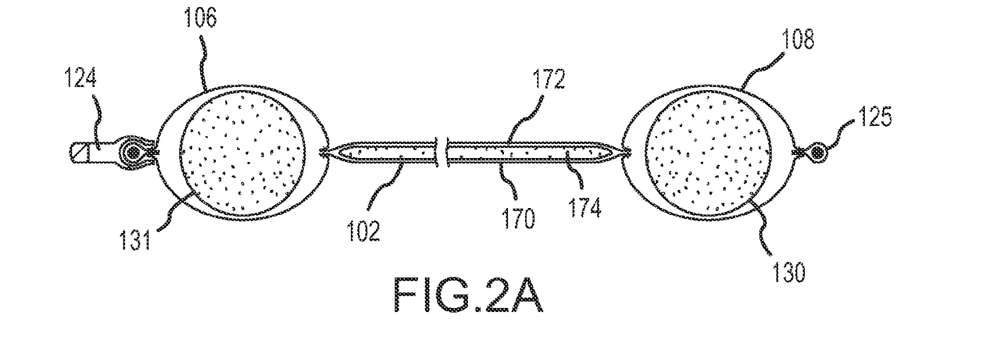
FIG. 2A illustrates a cross section view of the seat liner of FIG. 2 according to an embodiment of the present invention.
Figure 3:
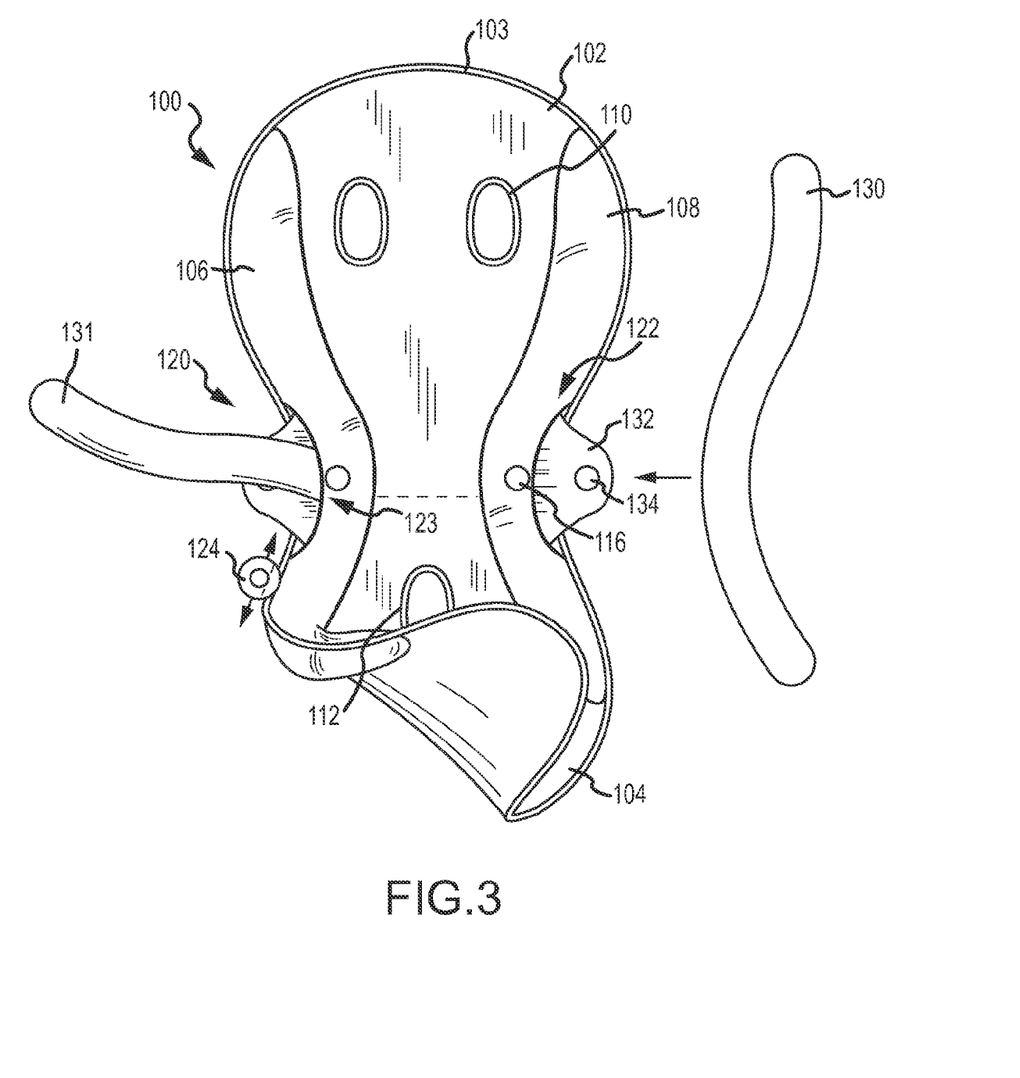
FIG. 3 illustrates a back view of the seat liner and further illustrates various aspects of the seat liner according to an embodiment of the present invention.

FIGS. 2, 2A, and 3 illustrate various front, back, and cross section views of seat liner 100. As previously described, seat liner 100 includes outer edge or periphery 103, upper portion 102 positioned at one end of the seat liner, lower portion 104 positioned at an opposite end of the seat liner, and left and right sides, 105 and 107. The upper portion 102 and lower portion 104 are semi-circular in shape. The seat liner 100 comprises a biconcave profile where a middle portion 120 of the seat liner positioned between the upper and lower portions, 102 and 104, has a smaller lateral size than the upper and lower portions. The biconcave profile may ergonomically cushion and support a child placed on the seat liner 100 in a child seat. The semi-circular upper portion 102 and lower portion 104 and the biconcave profile provide a continuous smooth and curved outer periphery or edge 103 that does not include sharp corners and/or bends.

As illustrated in FIG. 2A, the seat liner includes a first surface 172 made of a first material and a second surface 170 on an opposite side of the first surface. The second surface is made of a second material. The first and second material may be the same type of material or may be a different type of material. For example, the first material may include a soft polyester or fleece material and the second material may include a cotton material. The use of different materials may allow the seat liner 100 to be flipped so that a different surface and a different material contact the child. Such a design allows for a single seat liner 100 to be used to accommodate various needs of the child. For example, the soft polyester or fleece surface may be used to contact the child in cooler weather to insulate the child while the cotton material may be used to contact the child in warmer weather to keep the child cool and dry. Disposed between the first and second surfaces, 172 and 170, is a padding material 174 that cushions a child. In some embodiments, the seat liner does not include a padding material 174 between the first and second surfaces, 172 and 170. Rather, the first and second surfaces, 172 and 170, directly contact one another. In yet other embodiments, a single material may be used in place of first and second surfaces, 172 and 170. Such embodiments provide a lightweight seat liner that may help cool a child when used in warm climates.

The first surface 172 may be attached to the second surface 170 along the outer periphery 103 at the top and bottom ends, 102 and 104, and along an inside edge of the left and right chambers, 106 and 108. The surfaces, 172 and 170, may be attached by sewing the first and second materials together or using a fastening mechanism, such as a zipper or zippers, buttons, snaps, magnets, hook and loop fasteners, and the like. In addition, the outer periphery 103 includes a track 125 along with an attachment mechanism 124 slides. The track 125 includes an elongate channel having a rod, rope, cord, wire, and the like disposed therein. The rod, rope, cord, or wire provides sufficient rigidity so that the attachment mechanism 124 may slide along track 125. Examples of attachment mechanisms 124 and tracks 125 are described in U.S. patent application Ser. Nos. 12/968,842, 12/619,481, 12/827,768, 12/827,823, and 12/827,870, the entire disclosures of which are hereby incorporated by reference herein. Further, the seat liner 100 may include one or more seams 119 (see FIG. 2) that partitions the seat liner 100 into one or more sections. For example, a seam 119 may extend laterally across the seat liner 100 near the middle portion 120 where the child will sit to provide additional bendability to the seat liner 100.

Figure 4:
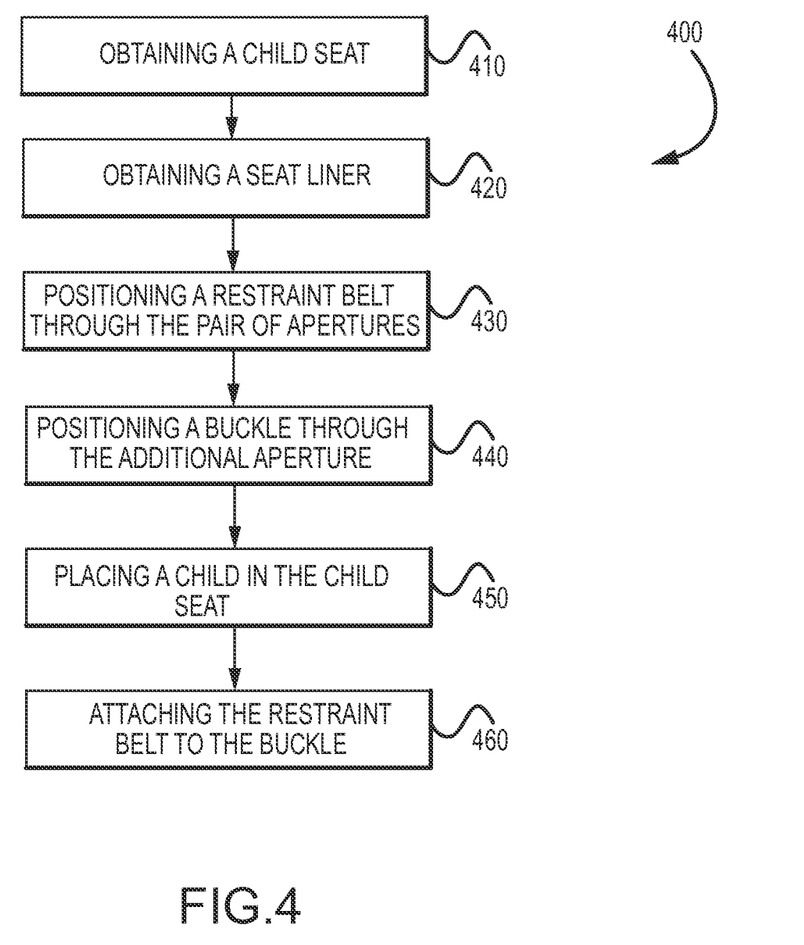
FIG. 4 illustrates a method of using a seat liner according to an embodiment of the present invention.

The attachment mechanism 124 is coupled with track 125 of outer periphery 103. The attachment mechanism slides along a portion of outer periphery 103 as indicated by the arrows. In some embodiments, attachment mechanism 124 may slide along the entire outer periphery 103. FIGS. 3 and 4 depict the attachment mechanism 124 being slid along the outer periphery 103 from an area near the upper portion 102 to an area near the lower portion 104. In embodiments where the outer periphery 103 does not include sharp edges or bends, such as those depicted in FIGS. 3 and 4, the attachment mechanism 124 may be easily slid around the entire outer periphery 103 of the seat liner 100.

The attachment mechanism 124 may include a clip that is fitted about track 125 as shown in FIG. 2A. For example, the clip may be fitted or snapped onto each side of the rod, rope, cord, or wire disposed in the elongate channel of track 125. The clip may allow attachment mechanism 124 to be removed from the seat liner 100. In other embodiments, the attachment mechanism 124 may be non-removably coupled with or fitted about track 125. The attachment mechanism 124 may also include a central aperture or attachment portion (see FIG. 2) that allows the attachment mechanism 124 to couple with various objects, such as toys, pacifier(s), stuffed animals, food or drink items, and the like. For example, the child's toy may be coupled with the attachment mechanism 124 via an elastic band that is secured to the central aperture so that the child is able to play with the toy while the toy remains attached to the seat liner 100 and child seat. When the child is finished playing with the toy, the attachment mechanism 124 prevents the toy from being lost or misplaced since the toy remains attached to the attachment mechanism and seat liner. The slidability of the attachment mechanism 124 in relation to the seat liner 100 allows the attached items to be repositioned anywhere along the seat liner.

The seat liner 100 additionally includes a pair of apertures 110 positioned in or near the upper portion 102 and an additional aperture 112 positioned in or near the lower portion 104. A pair of restraint straps or belts (not shown) may be positioned through the apertures 110 and a buckle and restraint strap (not shown) may be positioned through the additional aperture 112. The seat liner 100 may include additional apertures to accommodate other belts, straps, or other objects of the child seat. The biconcave profile of the seat liner 100 may allow some straps or belts to be secured about the child without having to be positioned through an aperture. For example, the smaller lateral size of the middle portion 120 may allow waist belts or straps (not shown) to be fitted around the child's waist without having to be positioned through any apertures.

The seat liner 100 further includes left chamber 106 and right chamber 108 each having a hollow interior that a padding member, 130 and 131, may be inserted within (see FIG. 2A). FIG. 3 depicts padding member 130 removed from right chamber 108 of seat liner 100. Also, although the Figs. depict the padding member as being curved, in some embodiments the padding member is substantially straight. Left and right chambers, 106 and 108, each extend along the left and right outer periphery 103 of the seat liner 100 from the upper portion 102 to the lower portion 104. Left and right chambers, 106 and 108, comprise a biconcave profile and each chamber includes an opening, 123 and 122 respectively, through which padding members, 131 and 130 respectively, are inserted into the hollow interior of the respective chamber (see FIG. 2A). FIG. 3 depicts padding member 131 being inserted within or extending from an opening 123 of left chamber 106.

The biconcave profile of the chambers, 106 and 108, may make the seat liner contour to the shape of a child seat when the padding members, 131 and 130, are inserted within the chambers. For example, when the padding members, 131 and 130, are inserted within the biconcave chambers, 106 and 108 respectively, the padding members may cause the upper portion 102 and/or lower portion 104 to bend inward toward the middle portion 120 so that the seat liner resembles the curved shape of a child seat (e.g., the curved shape of a stroller seat). This may make placing the seat liner and child in the child seat easier.

Openings, 122 and 123, may be located near the middle portion 120 or anywhere else, such as the upper portion 102, the lower portion 104, the first surface 172, the second surface 170, and the like. Opening 122 includes a flap 132 that may laterally extend beyond the outer periphery 103 when padding 130 is removed from chamber 108. Flap 132 may be folded around a portion of padding member 130 when the padding member is inserted into the chamber and may be secured to a fastening member 116 of chamber 108 and/or seat liner 100 to secure padding member 130 within chamber 108. Flap 132 includes a fastening member 134 that corresponds to fastening member 116 and that facilitates in securing flap 132 closed. The fastening members, 116 and 134, may include clamps, clips, snaps, buttons, hook and loop fasteners, zippers, magnets, and the like. Opening 123 also include a flap and fastening member similar to opening 122.

Padding members, 130 and 131, may be made of a variety of materials including an inflatable air/water bladder, a foam material, a gel material, a pillow, a fabric casing having a fiberfill cushion interior, and the like. Padding members, 130 and 131, may be removed from chambers, 108 and 106, and replaced with other padding members having a different size and/or a different material. In this manner the cushioning of the seat liner 100, support of the seat liner 100, and/or size of the seat liner 100 may be adjusted to accommodate the various needs of the child. For example, as the child grows, smaller padding members may be used or the padding members may be removed entirely so that the seat liner 100 may be used without padding members, 130 and 131, thus prolonging the useful life of the seat liner. Similarly, padding members, 130 and 131, may include an inflatable bladder that is inflated or deflated to adjust the size, support, and/or cushioning of the padding. Padding members, 130 and 131, may be tubular in shape with a length in the range of about 10 inches to about 30 inches and a diameter of about 1 inch to 4 inches.

Figure 2B:
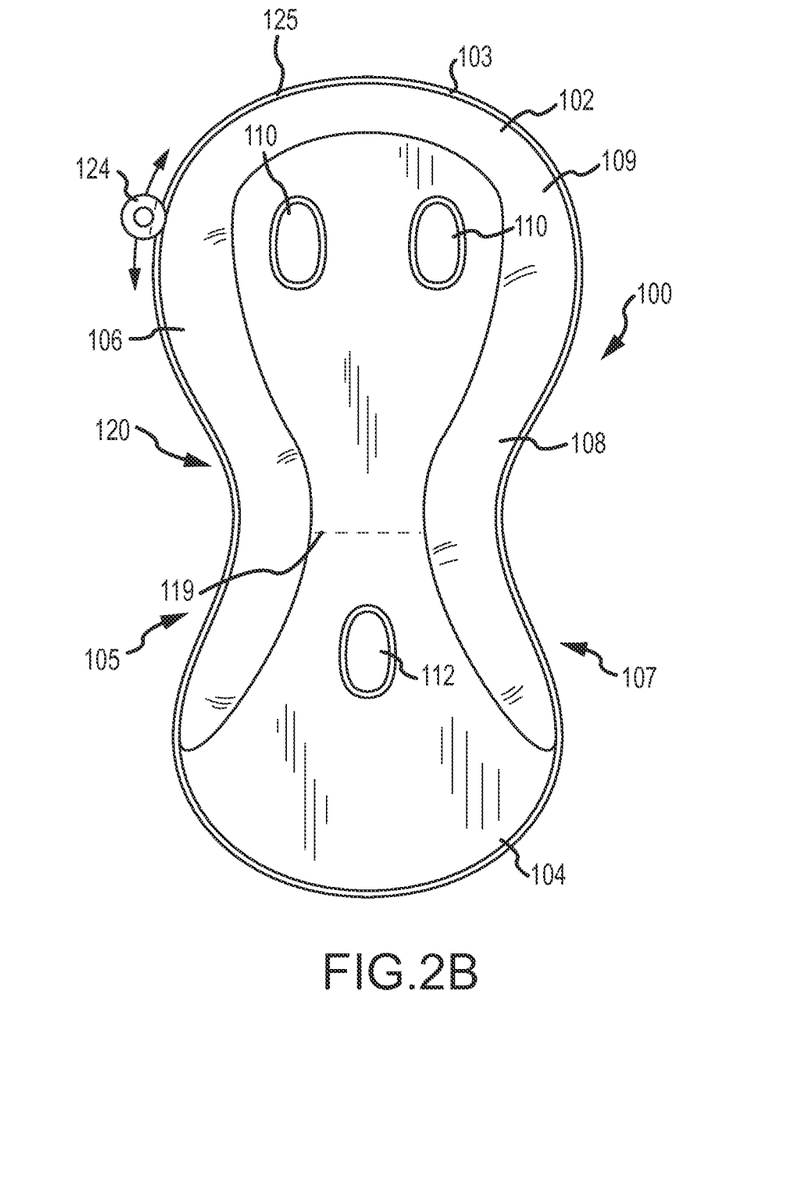
FIG. 2B illustrates a front view of a seat liner having a single chamber that extends from the left side of the seat liner to the right side according to another embodiment of the present invention.

FIG. 2B illustrates a seat liner that is similar to the seat liner of FIGS. 2, 2A, and 3 except that the seat liner includes a single chamber 109 that extends around a majority of the outer periphery 103 of the seat liner. The chamber 109 extends from the lower portion 104 to the upper portion 102 of left side 105, across the outer periphery of the upper portion 102, and from the upper portion 102 to the lower portion 104 of the right side 107 so that a single chamber extends from the left side 105 to the right side 107. Using such a chamber may help cushion and comfort a child's head, neck, and body. A single padding member (not shown) or multiple padding members (not shown) may be inserted within the single chamber 109. For example, a single padding member may be inserted within an opening (not shown) of the single chamber 109 and threaded within the chamber around the outer periphery of the seat liner.

Although FIG. 2B depicts the single chamber 109 extending into the lower portion 104 of the right and left sides, 107 and 105, in some embodiments, the single chamber 109 extends only to the middle portion 120 or to a position above the middle portion. The single chamber 109 may include one or more openings (not shown). For example, in one embodiment, the single chamber 109 includes openings on both the left and right sides, 105 and 107, as shown in FIG. 3. In another embodiment, the single chamber 109 includes a single or an additional opening located in the upper portion 102 toward the uppermost portion of the seat liner.

FIG. 4 illustrates a method 400 of using a seat liner with a child seat. At block 410, a child seat, such as a stroller, may be obtained or provided. At block 420, a seat liner may be obtained or provided. The seat liner may be similar to the seat liners described herein and may include a fabric having an outer periphery, an upper portion, a lower portion, a right side, a left side, a pair of apertures in the upper portion, an additional aperture in the lower portion, a right chamber and/or left chamber, a right padding and/or left padding removably held within a respective chamber, and the like. At block 430 a restraint belt of the child seat may be positioned through each of the pair of apertures in the upper portion.

At block 440, a buckle may be positioned through the additional aperture in the lower portion. At block 450, a child may be placed in the child seat (e.g., stroller) so that the child is seated on the seat liner. At block 460, the restraint belts may be coupled with, attached, or secured to the buckle to secure the child placed in the child seat. The method may also include positioning a right and/or left padding within a respective chamber. Positioning the padding within a respective chamber may include inserting the padding through an opening of the chamber and folding a flap over a portion of the padding and securing the flap to a fastening mechanism to secure the padding within the chamber. In addition, the seat liner may include an attachment member as described herein and the method may include adjusting the attachment member with respect to the seat liner and/or coupling an object to the attachment mechanism.

Figure 5:
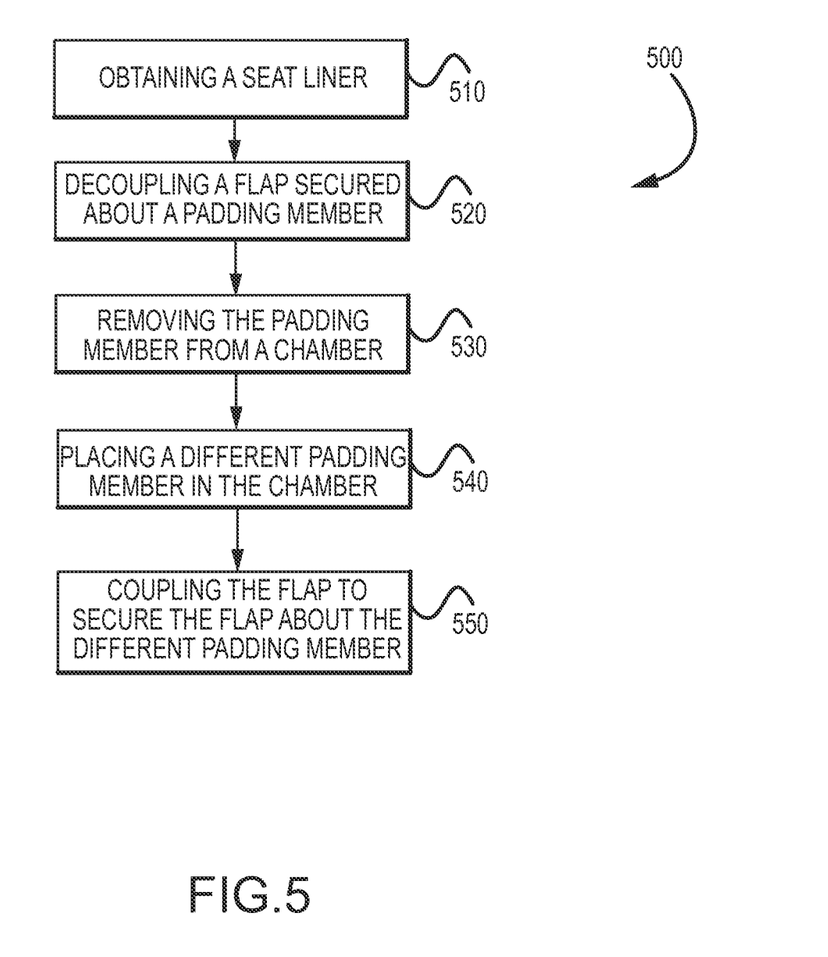
FIG. 5 illustrates a method of configuring a seat liner according to an embodiment of the present invention.

FIG. 5 illustrates a method 500 for configuring a seat liner. At block 510, a seat liner may be provided or obtained. The seat liner may be similar to those described herein. At block 520, a flap may be decoupled from a fastening mechanism to allow a padding member to be removed from within a chamber of the seat liner. The flap may secure the padding member within the chamber when secured to the fastening mechanism. At block 530, the padding member may be removed from the chamber. At block 540, a different padding member may be obtained and placed within the chamber to adjust the cushion size of the seat liner and/or the cushion softness of the seat liner. At block 550 the flap may be coupled to the fastening mechanism to secure the different padding member within the chamber.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A stroller liner comprising:
  a fabric having:
   an outer periphery;
   an upper portion;
   a lower portion, wherein the upper portion and lower portion comprise arcuate configurations;
   a right side; and
   a left side, the right and left sides having a biconcave profile, wherein the left and right sides curve inward towards each other from a top portion of each of the left and right sides to a middle portion of each side and curve outward from the middle portion of each of the left and right sides to a bottom portion of each side so that together the left and right sides form an hourglass shape;

an elongate chamber disposed at the outer periphery of at least one of the sides, the chamber extending from the upper portion to the lower portion, wherein the chamber defines an opening;

an elongate padding member removably held within the chamber to cushion a child placed in the stroller, wherein the padding member has two ends, wherein the opening in the chamber is positioned at a location along the chamber disposed between two ends of the chamber such that the padding member is insertable into the chamber by the insertion of one of the ends of the padding member through the opening, the sliding of the inserted end into the chamber, the insertion of the other end of the padding member through the opening and the sliding of the other end into the chamber; and an attachment member coupled with the outer periphery and slidable along at least a portion of the outer periphery, the attachment member being configured to couple with one or more objects to attach the one or more objects to the stroller liner.

2. The stroller liner of claim 1, wherein the chamber comprises a single chamber that extends from the lower portion of the left side along the outer periphery of the upper portion to the lower portion of the right side.

3. The stroller liner of claim 1, further comprising an additional chamber disposed at the outer periphery of the opposite side of the stroller liner, and an additional padding member removably held within the additional chamber to cushion the child placed in the stroller.

4. The stroller liner of claim 1, wherein the chamber comprises an opening that allows the padding member to be positioned within and removed from the chamber.

5. The stroller liner of claim 4, wherein the opening comprises a flap and a coupling mechanism, wherein the flap is folded over a portion of the outer surface of the padding and attached to the coupling mechanism to secure the padding within the chamber.

6. The stroller liner of claim 4, wherein the fabric comprises a front surface having a first material and a back surface having a second material, wherein the first material is different than the second material so that when the stroller liner is flipped, a different material contacts the child placed in the stroller.

7. The stroller liner of claim 1, wherein the padding member is selected from the group consisting of an inflatable air bladder, a foam material, a pillow, a fabric casing having a fiberfill cushion, and a gel material.

8. The stroller liner of claim 1, wherein the padding member and the stroller liner approximate the contour of the child placed in the stroller.

9. The stroller liner of claim 1, further comprising:
a pair of apertures in the upper portion configured to receive a pair of restraint belts of the stroller; and
an additional aperture in the lower portion configured to receive a buckle of the stroller, the pair of restraint belts and the buckle being configured to couple together to secure a child placed in the stroller.

10. A seat liner comprising:
a flexible fabric having an outer periphery defined by:
a semi-circular upper portion positioned longitudinally toward one end of the seat liner;
a semi-circular lower portion positioned longitudinally toward an opposite end of the seat liner;
a right side; and
a left side, the right and left sides having a biconcave profile, wherein the left and right sides curve inward towards each other from a top portion of each of the left and right sides to a middle portion of each side and curve outward from the middle portion of each of the left and right sides to a bottom portion of each side so that together the left and right sides form an hourglass shape;
a right chamber disposed at the outer periphery of the right side;
a left chamber disposed at the outer periphery of the left side, the right and left chambers extending from the upper portion to the lower portion and being configured to each receive a padding;
a right padding positionable within the right chamber;
a left padding positionable within the left chamber, the right and left padding being configured to cushion a child placed in the seat;
the left padding and right padding removably held within the left chamber and right chamber, respectively, to cushion a child placed in the stroller, wherein the left padding and right padding each have two ends, wherein an opening of each of the right chamber and the left chamber is positioned at a location along the chamber disposed between two ends of the chamber such that the respective padding is insertable into the chamber by the insertion of one of the ends of the respective padding through the respective opening, the sliding of the inserted end into respective chamber, the insertion of the other end of the same respective padding through the same opening and the sliding of the other end into the respective chamber; and
an attachment member coupled with the outer periphery and slidable along at least a portion of the outer periphery, the attachment member being configured to couple with one or more objects to attach the one or more objects to the stroller liner.

11. The seat liner of claim 10, wherein the left chamber is coupled with the right chamber by a chamber that extends along the outer periphery of the semi-circular upper portion such that the left and right chambers comprise a single chamber.

12. The seat liner of claim 10, wherein each of the openings comprise a flap and a coupling mechanism, wherein the flap is foldable over a portion of the respective padding and attachable to the coupling mechanism to secure the padding within the respective chamber.

13. The seat liner of claim 10, further comprising:
a pair of apertures in the upper portion through which a pair of restraint belts of the seat are positionable; and
an additional aperture in the lower portion through which a buckle of the seat is positionable, the pair of restraint belts and the buckle being attachable to secure a child placed in the seat.

* * * * *